United States Patent
Manning

(10) Patent No.: US 8,342,483 B1
(45) Date of Patent: Jan. 1, 2013

(54) HINGED WIRE INSTALLATION TOOL

(76) Inventor: James C. Manning, Rochelle, IL (US)

( * ) Notice: Subject to any disclaimer, the term of this patent is extended or adjusted under 35 U.S.C. 154(b) by 976 days.

(21) Appl. No.: 12/362,264

(22) Filed: Jan. 29, 2009

Related U.S. Application Data

(60) Provisional application No. 61/024,449, filed on Jan. 29, 2008.

(51) Int. Cl.
- B63B 35/03 (2006.01)
- H02G 1/08 (2006.01)
- B66D 3/08 (2006.01)
- B23Q 3/00 (2006.01)

(52) U.S. Cl. ........ 254/134.3 R; 254/134.3 FT; 254/395; 269/289 MR

(58) Field of Classification Search ......... 254/134.3 FT, 254/134.3 R, 395; 269/289 MR
See application file for complete search history.

(56) References Cited

U.S. PATENT DOCUMENTS

| | | |
|---|---|---|
| 2,746,715 A | 5/1956 | Sherrod |
| 3,372,441 A | 3/1968 | Fisher |
| 4,050,205 A | 9/1977 | Ligda |
| 4,358,089 A | 11/1982 | Metcalf |
| 4,541,615 A | 9/1985 | King, Jr. |
| 4,589,632 A * | 5/1986 | Smith ............... 254/418 |
| 4,738,634 A | 4/1988 | Taylor et al. |
| 5,029,817 A | 7/1991 | Tamm |
| 5,096,163 A | 3/1992 | Swearingen |
| 5,170,014 A | 12/1992 | Borsh |
| 5,271,605 A | 12/1993 | Damron |
| 5,297,690 A | 3/1994 | Bardaville |
| 5,488,198 A | 1/1996 | Kramer |
| 5,573,226 A * | 11/1996 | Smith ............... 254/395 |
| 5,627,342 A | 5/1997 | Kramer |
| 6,349,460 B1 | 2/2002 | Eslambolchi et al. |
| 7,178,226 B2 | 2/2007 | Manning |

* cited by examiner

*Primary Examiner* — Lee D Wilson
*Assistant Examiner* — Nirvana Deonauth
(74) *Attorney, Agent, or Firm* — Reinhart Boerner Van Deuren P.C.

(57) ABSTRACT

A wiring tool and method are provided for protecting a length of wiring being pulled along a wiring path through a connection box, through use of an attachment plate arrangement of the wiring tool having first and second plate elements cooperatively configured for movement from first to second relationships with respect to one another such that the wiring tool can be removed from or placed about the length of wiring without having to feed the entire length of wiring through a closed periphery of an aperture in the attachment plate. One or more rollers mounted to the attachment plate along the aperture preclude the wiring from contacting edges of the aperture while being pulled through the wiring tool.

14 Claims, 4 Drawing Sheets

HINGED WIRE INSTALLATION TOOL

CROSS-REFERENCE TO RELATED PATENT APPLICATIONS

This patent application claims the benefit of U.S. Provisional Patent Application No. 61/024,449, filed Jan. 29, 2008, the entire teachings and disclosure of which are incorporated herein by reference thereto.

FIELD OF THE INVENTION

This invention relates to wiring tools, and more particularly to a wiring tool for use in protecting a length of wiring being pulled along a wiring path through a connection box.

BACKGROUND OF THE INVENTION

In the process of wiring a building, it is often necessary to pull wires through common routing members or components such as conduits, junction boxes and outlet boxes. It is important when installing the wiring to ensure that electrical insulation on the wiring is not damaged by being pulled across a sharp edge of one of the routing members or components. It is also desirable, to provide an apparatus and method which will allow a lone worker to safely pull the wiring through the routing members or components, without assistance from a second worker.

U.S. Pat. No. 7,178,226, to Manning, the inventor of the present invention, discloses a wire installation tool in which rollers attached around the periphery of an aperture in a plate are utilized for protecting the wiring as it is pulled through a routing member or component to which the plate has been attached. The disclosure and teachings of Manning U.S. Pat. No. 7,178,226 are incorporated herein by reference in their entireties. FIGS. 1-7 show one form of a wire installation tool, in accordance with Manning U.S. Pat. No. 7,178,226, which has proved to be effective and efficient for its intended purpose and has achieved commercial success. Despite its being generally effective for its intended purpose, in circumstance where a substantial length of wiring has been pulled through the wire installation tool, removal of the tool from the routing member or component requires that the wire installation tool be moved longitudinally along the entire length of the wiring before it can be removed from the wiring. This situation can occur at an intermediate junction box in a long wiring run.

It is therefore desirable to provide an improved wiring tool and method addressing the above-described problem.

BRIEF SUMMARY OF THE INVENTION

The invention provides an improved wiring tool and method for protecting a length of wiring being pulled along a wiring path along a connection box through use of an attachment plate arrangement having first and second plate elements configured and interconnected such that the wiring tool can be removed from or placed about the length of wiring without having to feed the entire length of wiring through the wiring tool.

In one form of the invention, a wiring tool is provided for protecting a length of wiring being pulled along a wiring path through a connection box having a face thereof through which the wiring path extends while the wiring is being pulled. The face of the connection box is adapted for attachment thereto of a connection box face plate by one or more screws.

The wiring tool includes an attachment plate arrangement and at least one roller operatively attached to the attachment plate arrangement. The attachment plate arrangement is adapted for attachment by screws to the face of the connection box in place of the connection box faceplate, and is formed from at least two plate elements cooperatively configured to define an aperture therethrough for passage of the wiring when the attachment plate arrangement is attached to the faceplate of the connection box. The aperture has a closed periphery thereof and at least one straight edge thereof when the plate elements are arranged in a first relationship to one another. The aperture has an open periphery thereof when the plate elements are arranged in a second relationship to one another.

The roller is operatively attached to the attachment plate arrangement adjacent the straight edge and is configured to preclude the length of wiring from contacting the straight edge of the apertures the wiring is pulled through the aperture. The first and second plate elements are configured such that, when they are oriented in the second relationship to one another, the wiring tool can be removed from or placed about the length of wiring without having to feed the entire length of wiring through the closed periphery of the aperture.

In some forms of the invention, the at least two plate elements are operatively attached to one another by hinge arrangement maintaining a hinged connection between the plate elements in both the first and second relationship to one another. Some forms of the invention may also include a locking arrangement for selectively connecting the at least two plate elements together with the plate elements positioned in the first relationship to one another whereat the plate elements define the closed periphery of the aperture.

In some forms of the invention, the attachment plate arrangement may include first and second substantially L-shaped plate elements each having a first and a second leg thereof. One leg of each plate element is connected substantially at a distal end thereof in a hinged relationship to a corresponding distal end of one of the legs of the other L-shaped plate elements, in such a manner that in the first relationship the L-shaped plate elements form a substantially rectangular-shaped aperture of closed periphery having two substantially perpendicularly oriented straight edges formed by each respective L-shaped plate element. In the second relationship between the plate elements, the L-shaped plate elements are rotatable about the hinged connection to open the periphery of the aperture. Four rollers may be operatively attached to the attachment plate arrangement, with one roller attached adjacent each of the four straight edges and configured to preclude the length of wiring from contacting the straight edge of the aperture adjacent to that respective roller as the wiring is pulled through the aperture.

In some forms of the invention, having L-shaped plate elements, a locking arrangement may be provided for selectively connecting the at least two L-shaped plate elements together when the plate elements are positioned in the first relationship to one another, such that the plate elements define the closed periphery of the aperture. The locking arrangement, in some forms of the invention, may include the threaded connection at the ends of the L-shaped plate members opposite the hinged connection.

Other aspects, objects and advantages of the invention will be apparent from the above description and appended claims, when considered in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention.

DETAILED DESCRIPTION OF THE INVENTION

Figure 1:
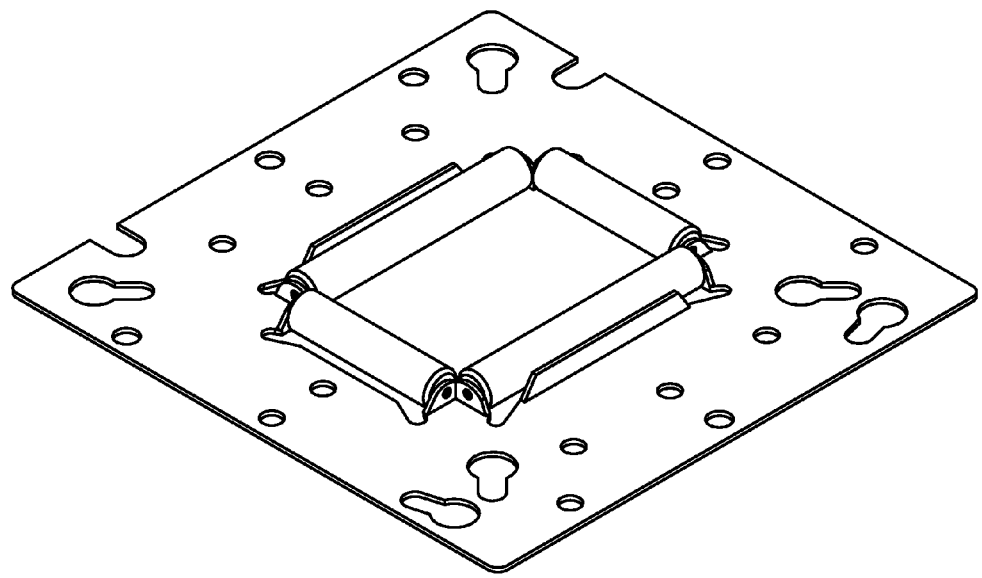
FIGS. 1 and 2 are perspective top and bottom illustrations, respectively, of a prior wire installation tool, in accordance with U.S. Pat. No. 7,178,226, by the inventor of the present invention.
Figure 2:
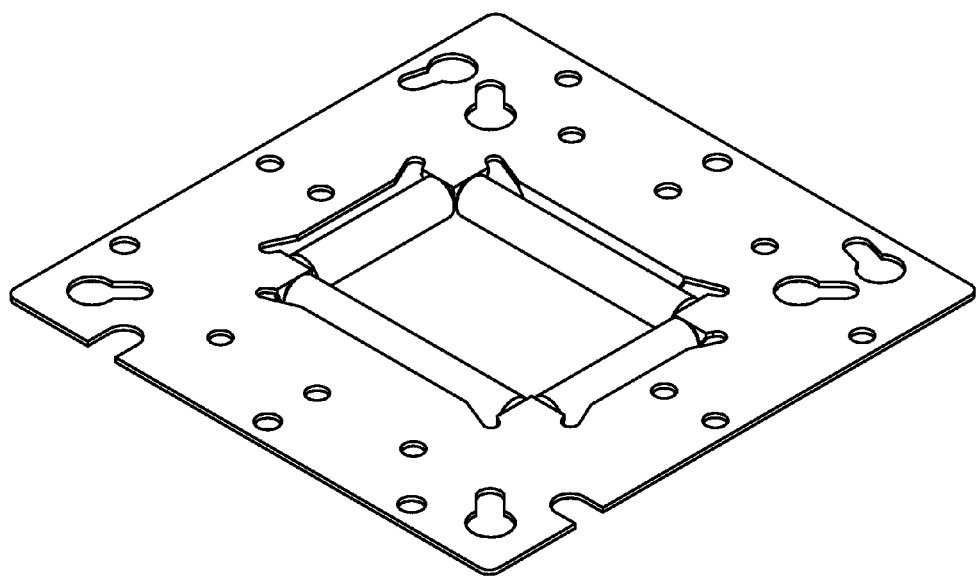
Figure 5:
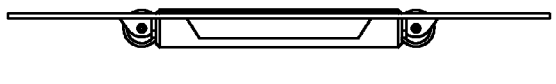
FIGS. 3-7 are orthographic views of the prior wire installation tool of FIGS. 1 and 2.
Figure 6:
Figure 3:
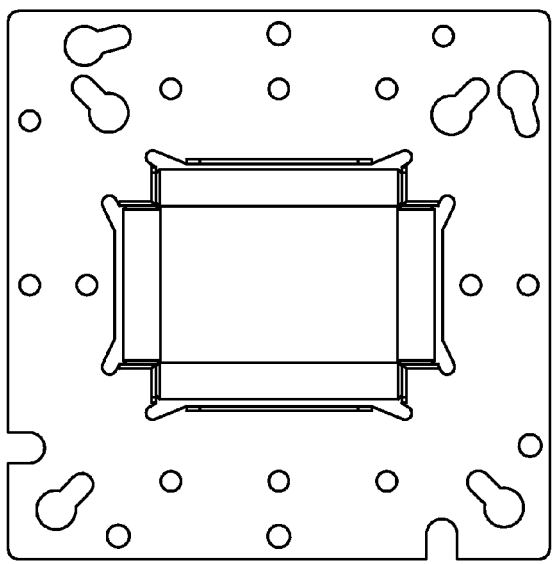
Figure 4:
Figure 7:
Figure 8:
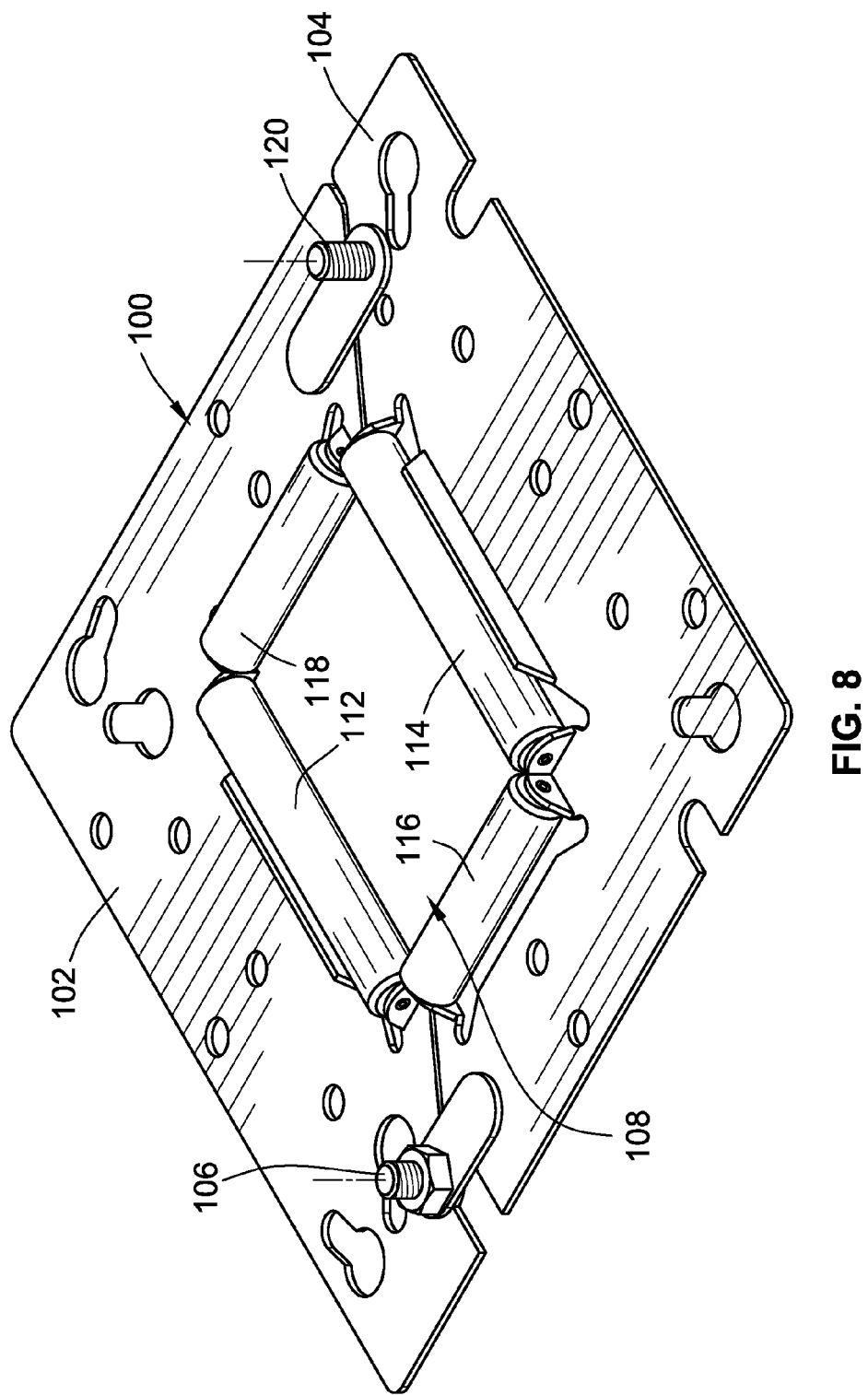
FIGS. 8 and 9 are perspective top views, in closed and open positions respectively, of an exemplary embodiment of a wiring tool, according to the invention, having first and second L-shaped plate elements joined at a hinged connection. The hinged connection allows the two L-shaped plate elements to be pivoted with respect from one another about the hinged connection from a first relationship shown in FIG. 8, wherein the L-shaped plate members form a substantially rectangular-shaped aperture having a closed periphery thereof, to a second relationship, as shown in FIG. 9, wherein the aperture has an open periphery including a gap which allows the tool 100 to be installed about or removed from a length of wiring without having to slide the tool along the entire length of the wiring. Rollers attached to the L-shaped plates along the edges of the rectangular shaped aperture preclude having the wiring contact edges of the aperture, as the wire is pulled through the wiring tool.
Figure 9:
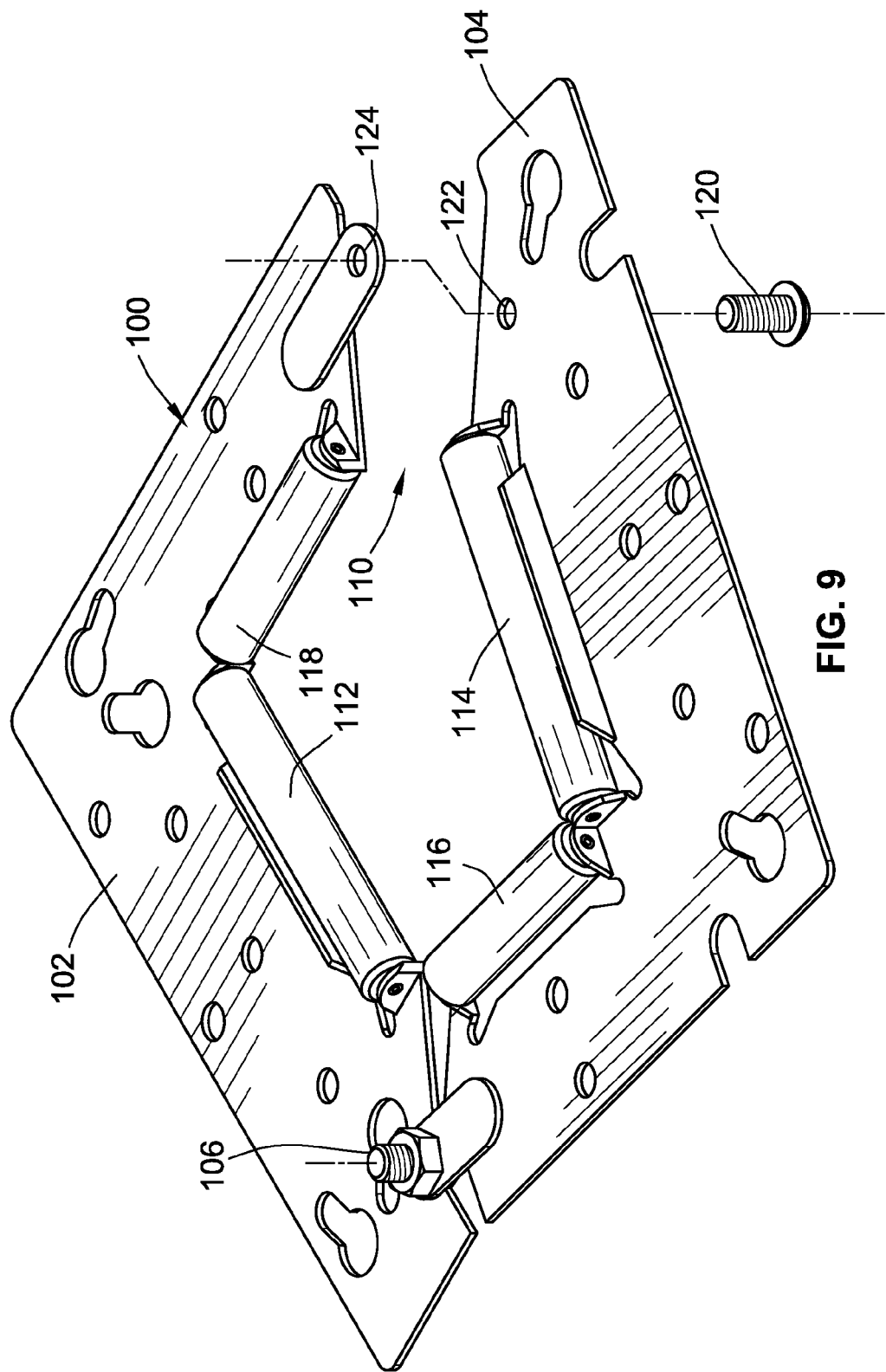

FIGS. 8 and 9 are photographs of a first exemplary embodiment of a wiring tool 100, according to the invention, having first and second L-shaped plate elements 102, 104 joined at a hinged connection 106. The hinged connection 106 allows the two L-shaped plate elements 102, 104 to be pivoted with respect from one another about the hinged connection 106 from a first relationship shown in FIG. 8, wherein the L-shaped plate members 102, 104 form a substantially rectangular-shaped aperture 108 having a closed periphery thereof, to a second relationship, as shown in FIG. 9, wherein the aperture 108 has an open periphery including a gap 110 which allows the tool 100 to be installed about or removed from a length of wiring (not shown) without having to slide the tool 100 along the entire length of the wiring.

The tool 100 also includes four rollers 112, 114, 116, 118, operatively installed along all four edges of the rectangular-shaped aperture 108 to preclude contact between the length of wire extending through the tool 100 and the edges of the rectangular aperture 108, when the tool is configured in the manner shown in FIG. 8.

The tool 100 also includes a locking arrangement in the form of a threaded connection wherein a locking screw 120 passing through a clearance hole 122 in the L-shaped leg 104 threadbly engages a threaded hole 124 in the first L-shaped plate element 102 to lock the ends of the L-shaped plate elements 102, 104 opposite the hinged connection 106 to one another, in the manner shown in FIG. 8.

In various embodiments of the invention, many of the aspects and elements disclosed, taught and suggested in the inventor's U.S. Pat. No. 7,178,226 may also be used singly or in various combinations with embodiments of the inventor's present invention.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A wiring tool, for protecting a length of wiring being pulled along a wiring path through a connection box having a face thereof through which the wiring path extends while the wire is being pulled and adapted for attachment thereto of a connection box faceplate by one or more screws, the wiring tool comprising; an attachment plate arrangement adapted for attachment by the screws to the face of the connection box in place of the connection box faceplate, and formed from at least two plate elements cooperatively configured to define an aperture therethrough for passage of the wiring when the attachment plate arrangement is attached to the face of the connection box, with the aperture having a closed periphery thereof and at least one straight edge thereof when the plate elements are arranged in a first relationship to one another and the aperture having an open periphery thereof when the plate elements are arranged in a second relationship to one another;

a roller operatively attached to the attachment plate arrangement adjacent the straight edge and configured to preclude the length of wiring from contacting the straight edge of the aperture as the wiring is pulled through the aperture; the first and second plate elements in the second relationship to one another being configured such that the wiring tool can be removed from or placed about the length of wiring without having to feed the entire length of wiring through the closes periphery of the aperture; wherein, the at least two plate elements are operatively attached to one another by a hinge arrangement maintaining a hinged connection between the plate elements in both the first and second relationships, to one another: wherein the tool is an electrician's tool for wiring a building using common routing components; the attachment plate arrangement is structured for attachment to routing components: the tool further comprises two or more elongated rollers rotatably mounted to the attachment plate arrangement and to extend at least partially into the aperture along the inner edge for precluding contact of a wire passing through the aperture with any portion of the inner edge of the aperture wherein the at least one roller has a diameter greater than a thickness of the attachment plate arrangement wherein, the attachment plate arrangement is generally square and includes mounting holes to correspond to standard mounting holes in routing components; and wherein, the mounting holes include slots positioned adjacent each corner of the plate.

2. The wiring tool of claim, further comprising, a locking arrangement for selectively connecting the at least two plate elements together with the plate elements positioned in the first relationship to one another, whereby the plate elements define the closed periphery of the aperture.

3. The wiring tool of claim 1, wherein: the attachment plate arrangement comprises first and second substantially L-shaped plate elements each having a first and a second leg thereof; one leg of each plate element being connected substantially at a distal end thereof in a hinged relationship such that in the first relationship the L-shaped plate elements form a substantially rectangular shaped aperture of closed periphery having two substantially perpendicularly oriented straight edges formed by each respective L-shaped plate element, and in the second relationship the L-shaped plate elements are rotatable about the hinged relationship to open the periphery of the aperture; and four rollers operatively attached to the attachment plate arrangement, with one roller attached adjacent each of the four straight edges and configured to preclude the length of wiring from contacting the straight edge of the aperture adjacent that respective roller as the wiring is pulled through the aperture.

4. The wiring tool of claim 3, further comprising, a locking arrangement for selectively connecting the at least two plate elements together with the plate elements positioned in the first relationship to one another, whereby the plate elements define the closed periphery of the aperture.

5. The wiring tool of claim 1, wherein, the aperture is rectangular shaped defined by the inner edge having four sides, and wherein at least four rollers are rotatably positioned adjacent the inner edge, with at least one roller for each side of the inner edge, for precluding contact of the wire with any of the four sides of the inner edge of the aperture.

6. The wiring tool of claim 5, wherein, the rollers include ends, the ends of the rollers being positioned proximate each other to form a substantially continuous surface for safely sliding wire across the rollers and through the aperture.

7. The wiring tool of claim 1, wherein, each roller is positioned to extend both above and below a plane defined by the attachment plate arrangement, such that wire may be passed through the aperture from either direction.

8. The wiring tool of claim 1, wherein, at least two of the two or more rollers are oriented substantially perpendicular to one another.

9. The wiring tool of claim 1, wherein, the aperture defines orthogonally intersecting longitudinal and lateral axes thereof, and the rollers are positioned to simultaneously preclude contact between any portion of the inner edge and one or more wires passing through the aperture in either direction along either of the longitudinal and lateral axes.

10. The wiring tool of claim 9, wherein, the rollers are rotatable about roller axes, at least one of which is oriented parallel to either the longitudinal or the lateral axis of the aperture.

11. The wiring tool of claim 9, wherein, the roller axis of each of the rollers is oriented parallel to either the longitudinal or the lateral axis of the aperture.

12. The wiring tool of claim 1, wherein, the aperture is rectangular.

13. The wiring tool of claim 1, wherein, at least one of the slots is angled relative to an outer edge of the attachment plate arrangement.

14. A wiring tool, for protecting a length of wiring being pulled along a wiring path through a connection box having a face thereof through which the wiring path extends while the wire is being pulled and adapted for attachment thereto of a connection box faceplate by one or more screws, the wiring tool comprising: an attachment plate arrangement adapted for attachment by the screws to the face of the connection box in place of the connection box faceplate, and formed from at least two plate elements cooperatively configured to define an aperture therethrough for a passage of the wiring when the attachment plate arrangement is attached to the face of the connection box, with the aperture having a closed periphery thereof and at least one straight edge thereof when the plate elements are arranged in a first relationship to one another and the aperture having an open periphery thereof when the plate elements are arranged in a second relationship to one another; a roller operatively attached to the attachment plate arrangement adjacent the straight edge and configured to preclude the length of wiring from contacting the straight edge of the aperture as the wiring is pulled through the aperture; the first and second plate elements in the second relationship to one another being configured such that the wiring tool can be removed from or placed about the length of wiring without having to feed the entire length of wiring through the closes periphery of the aperture; wherein, the at least two plate elements are operatively attached to one another by a hinge arrangement maintaining a hinged connection between the plate elements in both the first and second relationships to one another, wherein the attachment plate arrangement comprises first and second substantially L-shaped plate elements each having a first and a second leg thereof; one leg of each plate element being connected substantially at a distal end thereof in a hinged relationship such that in the first relationship the L-shaped plate elements form a substantially rectangular shaped aperture of closed periphery having two substantially perpendicularly oriented straight edges formed by each respective L-shaped plate element, and in the second relationship the L-shaped plate elements are rotatable about the hinged relationship to open the periphery of the aperture; four rollers are operatively attached to the attachment plate arrangement, with one roller attached adjacent each of the four straight edges and configured to preclude the length of wiring from contacting the straight edge of the aperture adjacent that respective roller as the wiring is pulled through the aperture; further comprising, a locking arrangement for selectively connecting the at least two plate elements together with the plate elements positioned in the first relationship to one another, whereby the plate elements define the closed periphery of the aperture; and wherein, the locking arrangement includes a threaded connection at the ends of the L-shaped plate members opposite the hinged connection.

* * * * *

UNITED STATES PATENT AND TRADEMARK OFFICE
CERTIFICATE OF CORRECTION

| | | |
|---|---|---|
| PATENT NO. | : 8,342,483 B1 | |
| APPLICATION NO. | : 12/362264 | |
| DATED | : January 1, 2013 | |
| INVENTOR(S) | : James C. Manning | |

It is certified that error appears in the above-identified patent and that said Letters Patent is hereby corrected as shown below:

Claim 2
Column 5, Line 20, after "The wiring tool of claim" add --1--.

Claim 14
Column 6, Line 38, change "closes" to --closed--.

Signed and Sealed this
Nineteenth Day of February, 2013

Teresa Stanek Rea
*Acting Director of the United States Patent and Trademark Office*